United States Patent [19]
Varin

[11] Patent Number: 5,273,494
[45] Date of Patent: Dec. 28, 1993

[54] AUTOMATIC TENSIONER FOR A TIMING BELT

[75] Inventor: Hervé Varin, Ballan, France

[73] Assignee: Hutchinson, Paris, France

[21] Appl. No.: 933,804

[22] Filed: Aug. 24, 1992

[30] Foreign Application Priority Data

Apr. 6, 1992 [FR] France .................. 92 04169

[51] Int. Cl.$^5$ .................................. F16H 7/08
[52] U.S. Cl. .................................... 474/110
[58] Field of Search .......... 474/101, 109, 110, 111, 474/113-117, 136-138, 133-135

[56] References Cited

U.S. PATENT DOCUMENTS

| | | | |
|---|---|---|---|
| 4,790,796 | 12/1988 | Okabe et al. | 474/110 |
| 5,116,284 | 5/1992 | Cho | 474/110 |
| 5,167,402 | 12/1992 | Nakakubo et al. | 474/110 X |

Primary Examiner—Thuy M. Bui
Attorney, Agent, or Firm—Stanley P. Fisher

[57] ABSTRACT

An automatic tensioner for a synchronous transmission toothed belt, including a roller adapted to cooperate with the belt and an actuator comprising within a cylindrical body: a piston pierced by a multiplicity of channels delimiting therein a pressure chamber and a supply chamber for a hydraulic fluid, a push rod secured to the piston and whose motion is suitable for being transmitted to the roller, a compression spring urging the piston towards the supply chambers, and a non-return valve received in the pressure chamber to open or close said channel, thereby allowing or preventing hydraulic fluid to pass between the pressure chamber and the supply chamber, when a lip of said valve comes into contact with or moves away from its seat in order to close or open said channels.

5 Claims, 5 Drawing Sheets

AUTOMATIC TENSIONER FOR A TIMING BELT

The invention relates to an automatic tensioner for a belt, in particular for a synchronous transmission belt, such as the timing belt of a piston engine.

Although not limited to this type of application, the invention relates in particular to a device for tensioning the belt of a synchronous transmission system such as a toothed timing belt for a vehicle engine, i.e. a belt which takes drive from the crank shaft and drives synchronously therewith one or more cam shafts, an injection pump if it is a diesel engine, etc. The ambit of the invention also extends to assemblies including such a tensioner having means associated therewith enabling it to be supported and intalled on the engine, and also to timing systems that include such an assembly.

BACKGROUND OF THE INVENTION

It is known that a synchronous transmission belt, e.g. a timing belt of a piston engine, operates properly only when the belt is at a satisfactory tension, and to impart this tension to the belt, proposals have already been made for devices known as "fixed tensioners", i.e. tensioners which, once intalled, are permanently locked in an operative condition. Such devices which impart significant tension to the belt but which are not capable of absorbing fluctuations in tension give rise to significant fatigue in the belt, thereby reducing its lifetime and that of the members which it drives. Such "fixed tensioners" have thus already been replaced by devices that are said to be "automatic" or "dynamic" and that compensate variations in belt tension in operation not only when starting and stopping the engine, but also whenever a driven member is put into operation. Depending on the mode of operation of an actuator that acts on a tensioner wheel which is pressed against the belt, these known devices may be classified into "rotary" type devices such as described in FR-A-2 633 689, or "rotating thrust" type devices as described in U.S. Pat. No. 4,883,446, or finally "linear axial thrust" type devices as described, for example, in EP-A1-0 330 362 or FR-A-2 645 931. Because of the advantages provided by systems in which the actuator is driven with sliding motion only (as compared with devices in which the motion comprises both sliding and rotation or comprises rotation only), it is such devices which, in general terms, the invention seeks to improve.

Such tensioners comprise a cylinder body in which a piston is slidably mounted, thereby delimiting a pressure chamber and an oil supply chamber, at least one channel passing through the piston to provide communication between the two chambers, and a valve for opening or closing said channel. With respect to certain operating features thereof, such tensioners may be characterized by the relationship between variations in the force generated as a function of the piston displacement (in other words by the stiffness of the device), it being understood that behavior of the transmission as a whole is optimized by command of the stiffness during reverse displacement of the piston.

Consequently, a general object of the invention is to provide a belt tensioner, in particular for a synchronous transmission belt such as a timing belt for a piston engine, which, while presenting the advantages of "linear axial thrust" type devices, has improved operating characteristics over known devices, in particular with respect to the progressiveness with which force is applied.

In this respect, an object of the invention is to provide such a tensioner device which enables the lifetime of the belt with which it is associated to be increased.

Another object of the invention is to provide such a tensioner device which makes it possible, when associated with a toothed timing belt of a vehicle engine, to prevent the teeth jumping when cold starting the engine, and also to ensure that the tension in the belt is stable under all operating conditions of said engine.

Another object of the invention is to provide such a device that can easily be adapted to engine assemblies that differ from one another in shape and/or other characteristics, such that the same basic device can be easily modified to equip a range of synchronous transmissions.

Finally, an object of the invention is to provide such a tensioner device having a structure that is particularly simple, and is thus low in cost.

SUMMARY OF THE INVENTION

The present invention provides an automatic tensioner for a synchronous transmission belt, in particular for a "linear axial thrust" type toothed timing belt for a piston engine, the tensioner including a roller adapted to cooperate with the belt and an actuator for said roller and comprising:
- a cylindrical body;
- a piston slidably mounted in said body, thereby delimiting a pressure chamber and a supply chamber for a hydraulic fluid, said chambers being capable of communicating with each other via at least one channel through said piston;
- a push rod secured to the piston and whose motion is adapted to be transmitted to the roller ;
- a compression spring urging the piston towards the supply chamber; and
- a non-return valve located in the pressure chamber to open or close said channel, thereby allowing or preventing hydraulic fluid to pass between the pressure chamber and the supply chamber;

wherein the piston is pierced by a multiplicity of channels and wherein the valve has an operative portion constituted by a flexible lip which deforms by bending and compression to come into contact with or to move away from its seat in order to close or open said channels.

The valve, and in particular the operative portion thereof, may be made of a material selected for its resilient deformation characteristics, and preferably a material of the elastomer or the plastomer type.

In a modification, the valve, and in particular the operative portion thereof, is made of a metal type material.

The relationship between the force or stress applied as a function of the displacement of the piston is preferably determined by selecting the stiffness of the valve which is itself determined by the cross-section shape of the flexible lip constituting its operative portion, and by the initial adjustment of the distance between the lip and the valve seat.

In an embodiment of the invention, the channels connecting the pressure chamber to the supply chamber are disposed parallel to the axis of symmetry of the valve, which valve comprises a body for its fixing by screwing, crimping, or fitting to the piston and a tapering flexible lip.

BRIEF DESCRIPTION OF THE DRAWINGS

Embodiments of the invention are described by way of example with reference to the accompanying drawings, in which.

DETAILED DESCRIPTION

Figure 1:
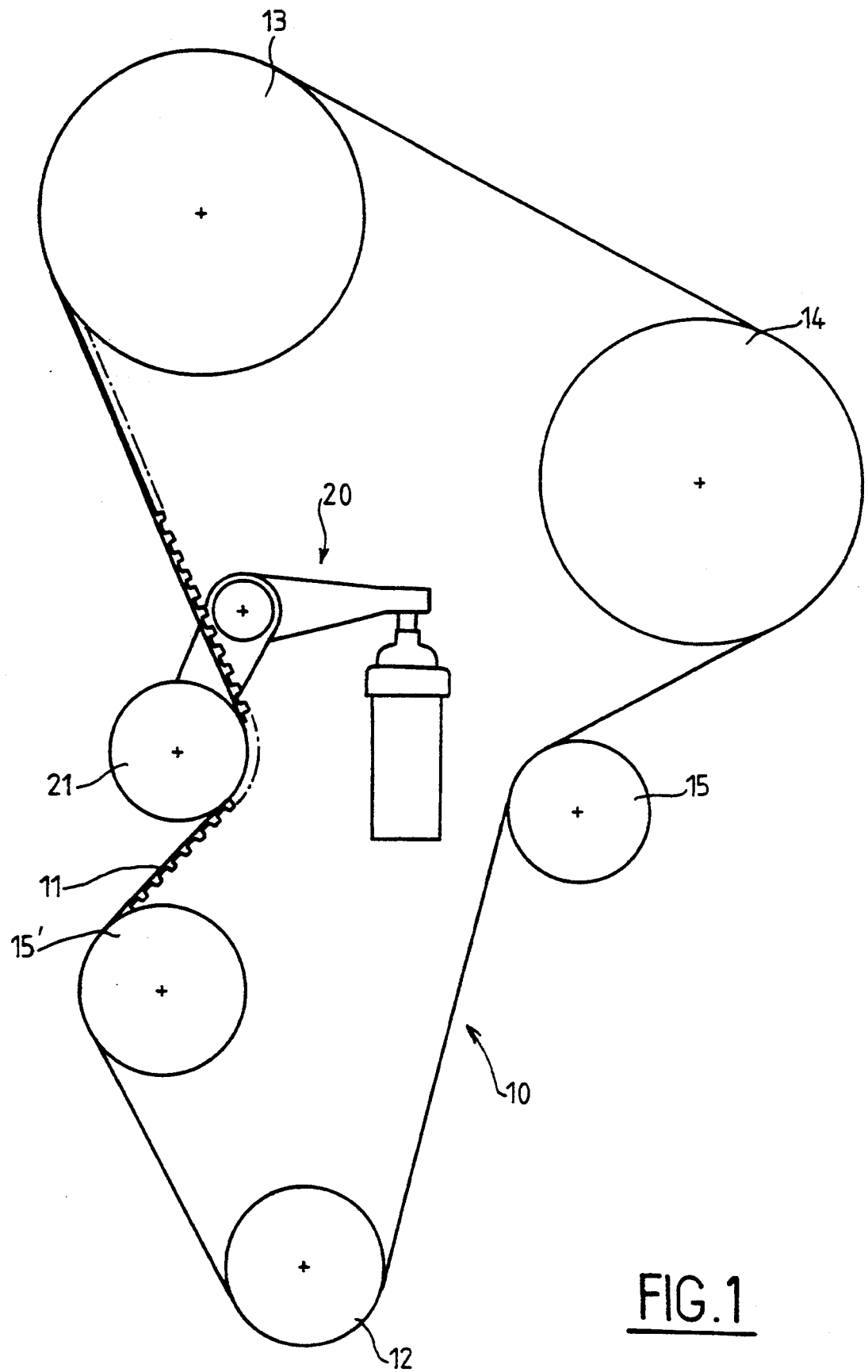
FIG. 1 is a highly diagrammatic view of a synchronous transmission having a belt and incorporating a tensioner of the invention.

Reference is first made to FIG. 1 which shows, highly diagrammatically, a synchronous transmission system 10, e.g. the timing system of a motor vehicle engine, in which a toothed belt 11 driven by a crank shaft 12 transmits power from the crank shaft to a cam shaft 13, to an injection pump 14 for a diesel engine, and to one or more auxiliary power takeoffs 15, 15', etc. The dynamic tensioner 20 is designed to compensate for variations in the tension in the belt 11 not only while the engine is being started or stopped, but also during normal operation of the engine and the members 13, 14, 15, 15', etc.

The tensioner device of the invention is disposed on the non-tight side of the belt 11 and acts thereon by means of a roller 21 (FIG. 3) carried by a bell crank pivoted about an axis 22' and having an arm 24 suitable for being displaced by an actuator 25 which constituted the essential component of the tightener or tensioner of the invention.

Figure 2:
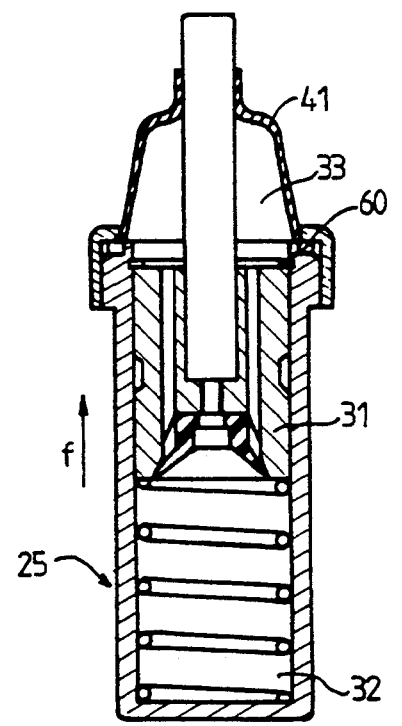
FIG. 2 is a longitudinal axial section through the actuator when unloaded prior to installation.
Figure 4:
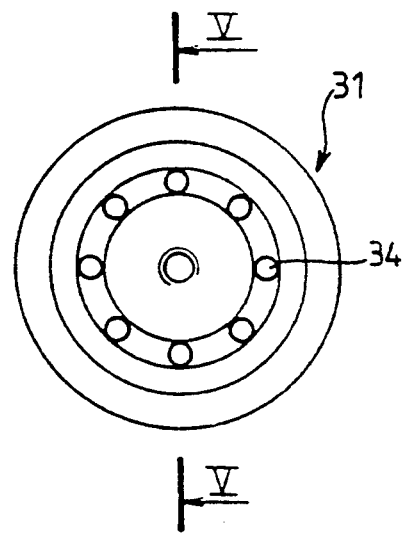
FIG. 4 is an end view of a piston in the device of the invention.

The actuator 25 shown in FIG. 2 in its empty, non-installed position thus comprises:

- a cylindrical body 30, e.g. made of steel, which is fixed to the engine or to a part of the engine of a motor vehicle either directly or via a plate, with the connection between the body and the assembly which supports it being made rigidly or via hinges that are resilient in torsion;
- a piston 31 made of bronze or wear metal (FIGS. 4 and 5) slidably received in the cylinder 30 and delimiting a pressure chamber 32 and a supply chamber 33 for hydraulic fluid such as oil, the chambers 32 and 33 being capable of communicating with each other via channels 34;
- a push rod 35 connected to the piston 31 and whose motion controls that of the arm 24 via a connection that involves direct contact or one or more hinges that are resilient in torsion;
- a compression spring 36 interposed between the end wall 37 of the body 30 and an annular abutment face 38 of the piston 31 to urge the piston towards the supply chamber, i.e. in the direction of arrow f in FIG. 2; and
- a non-return valve 40 received in the pressure chamber 32 to open or close the channels 34, thereby allowing or preventing hydraulic fluid to pass between the pressure chamber and the supply chamber, in a manner described below.

Figure 3:
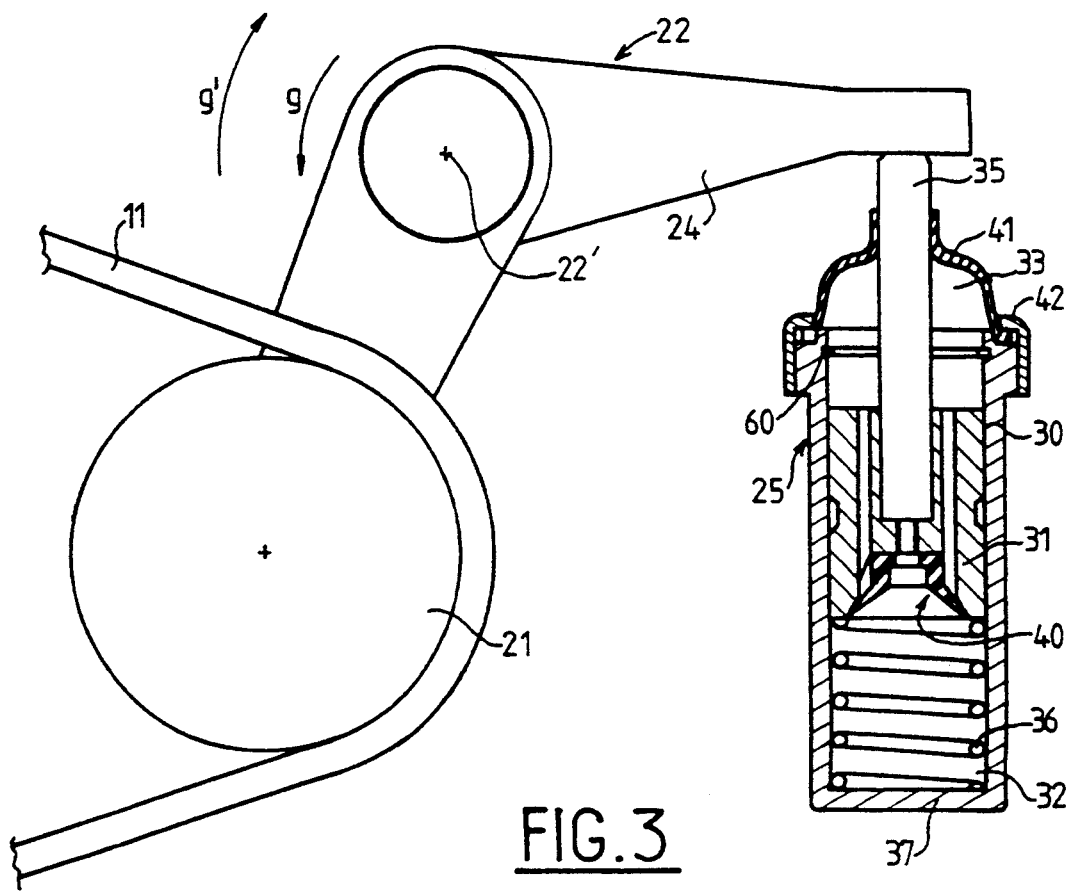
FIG. 3 is a view analogous to FIG. 2 showing the entire tensioner and with its actuator in a different condition.

As can clearly be seen in FIGS. 2 and 3, said supply chamber is delimited by a part 41 made of resilient material, e.g. rubber, which surrounds and is sealed to the push rod 35 at one end and which is secured to the cylinder 30 by crimping using a ring 42 or similar means at its other end.

According to the invention, the non-return valve 40 comprises a body 50 mounted in a bore 51 of the piston 31 and an operative portion constituted by a flexible lip 53 (which tapers in thickness, having a cross-section in an axial plane that is substantially triangular), which, when it deforms by bending, comes into contact with or moves away from a tapering seat 54 provided at the end of the bore 51 in the piston 31. The valve 40 is secured to the piston 31 by screwing, crimping, push fit or the like, and it may be made entirely of a material selected for its resilient deformation characteristics, and preferably a material of the elastomer or the plastomer type.

In a modification, the valve 40, or at least its operative lip 53, is made of a metal type material.

Figure 5:
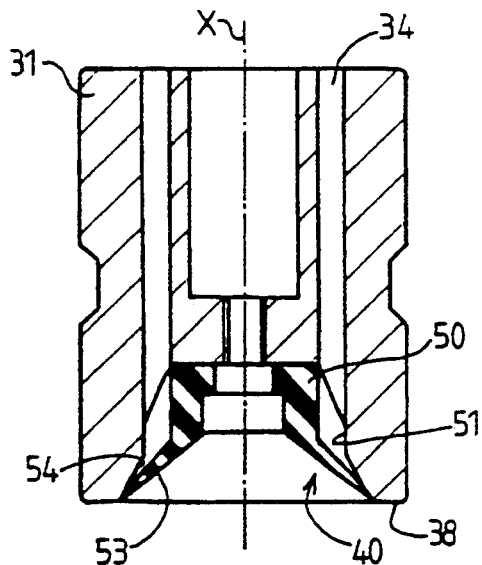
FIG. 5 is a section view on line V—V of FIG. 4.
Figure 6A:
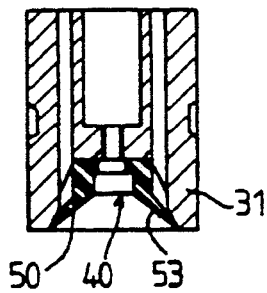
FIGS. 6A, 6B and 6C show the operation of a device of the invention.
Figure 6C:
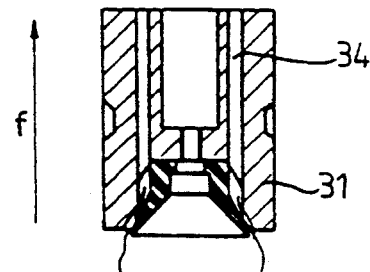
Figure 6B:
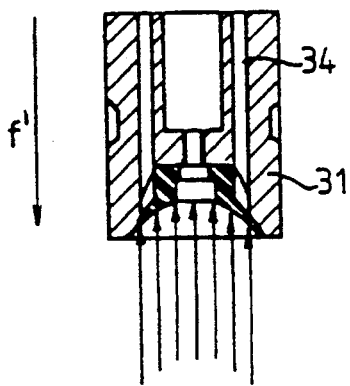

Whatever the material used for making the valve, it does not have a portion that is in rubbing contact with the cylindrical body, thus providing a significant advantage with respect to wear of the device, the channels 34 being opened and closed by bending deformation of the lip 53 (FIGS. 5 and 6).

Figure 7:
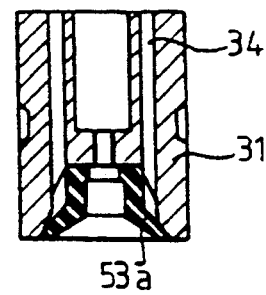
FIG. 7 shows a variant embodiment of a valve of the device of the invention.

By an appropriate choice for the cross-section shape of said lip, e.g. choosing a section that is not substantially triangular, but somewhat trapezium-shaped, as shown in FIG. 7, it is possible to adjust the stiffness of the valve, with the relationship between the force or stress exerted as a function of the displacement of the piston during operation of the actuator being adjustable by an appropriate choice of said stiffness and also by adjusting the initial distance between the operative portion of the valve and the seat 54, as is immediately apparent from the above description.

In the initial, rest condition of the non-installed actuator, as shown in FIG. 2, the piston 31 is in abutment against a spring clip 60 in the vicinity of the end of the supply chamber 33: the volume of the pressure chamber 32 is at a maximum and that of the supply chamber 33 is at a minimum, the resilient part 41 that provides volume compensation for said supply chamber then being in its unstressed condition. After the actuator has been installed in its working position, the tensioner is in the condition shown in FIG. 3 where the spring 33 (whose force is chosen appropriately) communicates an amount of static tension to the belt 11 that suffices under all operating conditions. This takes place via the piston 31, the pusher 35, and the bell crank 22 which tends to rotate in the direction of arrow g about the axis 22', taking the roller 21 with it.

When, starting from this condition, the tension in the tight side of the belt increases, e.g. on an auxiliary member 15 suddenly drawing power or upon starting of the engine having the belt fitted thereto, and when the tension in the slack side of the belt decreases, then the roller 21 is subjected to less tension by the belt: under the action of spring 36, piston 31 and pusher 35 tend to move in the direction of arrow f to cause the crank 22 to pivot in the direction of arrow g. During this movement of the piston, the flexible lip 53 of the valve 40 lifts off the seat 54 (FIG. 6C), thereby enabling oil to flow quickly from the supply chamber 33 to the pressure chamber 32 via the numerous channels 34. The oil is advantageously selected to have appropriate characteristics of fluidity in a temperature range of −40° C. to +140° C., for example.

When, in contradistinction with the just explained process, the tension in the slack side of the belt increases, e.g. upon active action of the cam shaft, thereby causing the belt 11 to apply a greater force to roller 21, the crank 22 tends to rotate in the direction of arrow g' (the opposite direction to arrow g). The arm 24 of crank 22 presses against pusher 35 which tends to move together with the piston 31 in the direction of arrow f' (opposite to arrow f, see FIG. 6B). During this displacement, the valve 40 closes quickly but without shock, thereby preventing oil from passing along the channels 34. The resulting increase in force opposes any reduction in the tension of the tight side of the belt and consequently eliminates any risk of the teeth of the belt jumping.

When the engine fitted with the belt stops, oil flows between the inside surface of the cylinder 30 and the piston 31 to compensate for expansion of the parts of the engine.

Figure 9:
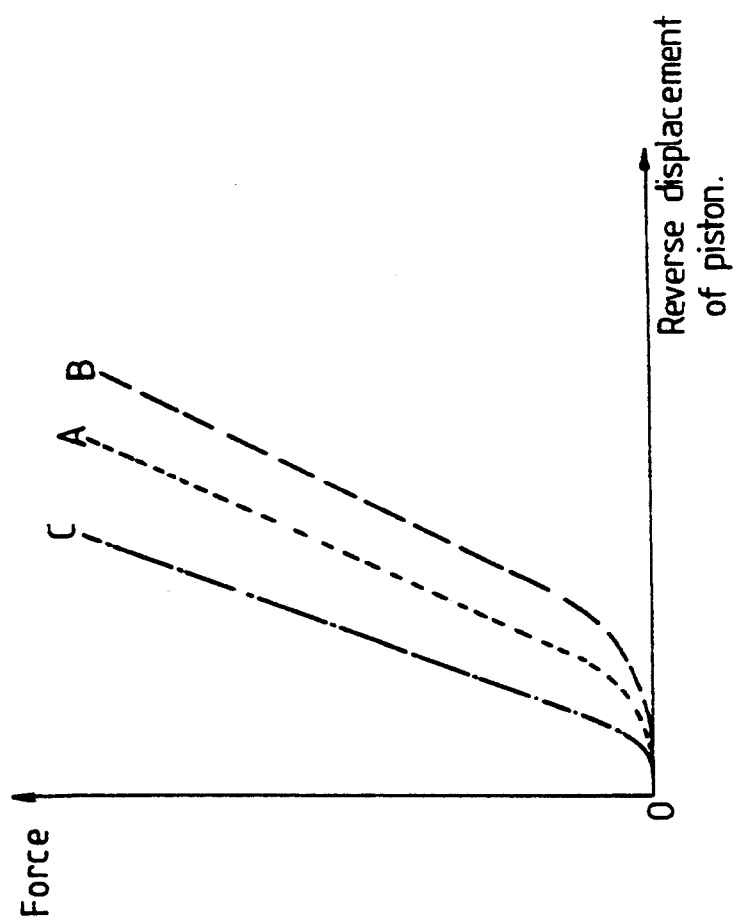
FIG. 9 is an explanatory diagram.

A tensioner of the invention makes it possible to cause a force increase as a function of the piston displacement in a manner that is more progressive and easier to adjust than that obtained with conventional devices, since the gradient of a curve that is representative of the relationship between force and piston displacement in a tensioner of the invention, referenced A in FIG. 9, is less than that of known devices, referenced C.

In addition, the gradient of said representative curve can be modified, as shown by the curve referenced B in FIG. 9, by changing the stiffness of the valve, e.g. by shaping the operative lip thereof as shown at 53a in FIG. 7 where the cross-section of the lip is trapezium-shaped rather than being triangular as it is in the embodiments of the previous figures.

Figure 8:
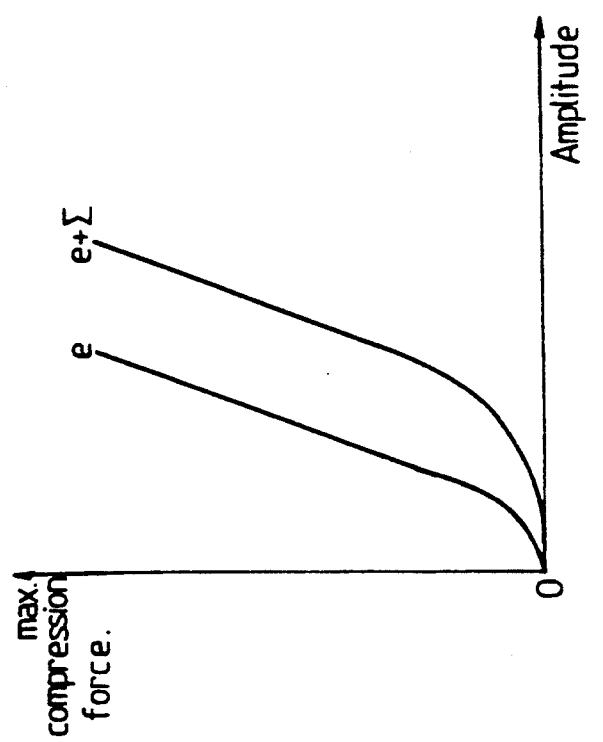
FIG. 8 is an explanatory diagram.
Figure 8A:
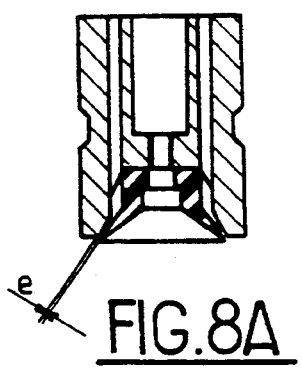
FIGS. 8A and 8B show how the valve is initially adjusted.
Figure 8B:
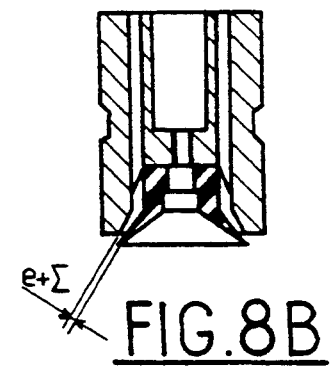

The variation law in the maximum compression force or stress as a function of the piston displacement can also be calibrated by an appropriate choice of the initial distance between the lip 53 or 53a of the valve 40 and the valve seat 54, with an increase Σ in said distance shifting the representative curve relative to the origin O, as can be seen in FIG. 8 which shows a curve relating to an initial distance e (FIG. 8A) and a curve relating to an initial distance e+Σ (FIG. 8B).

Figure 10:
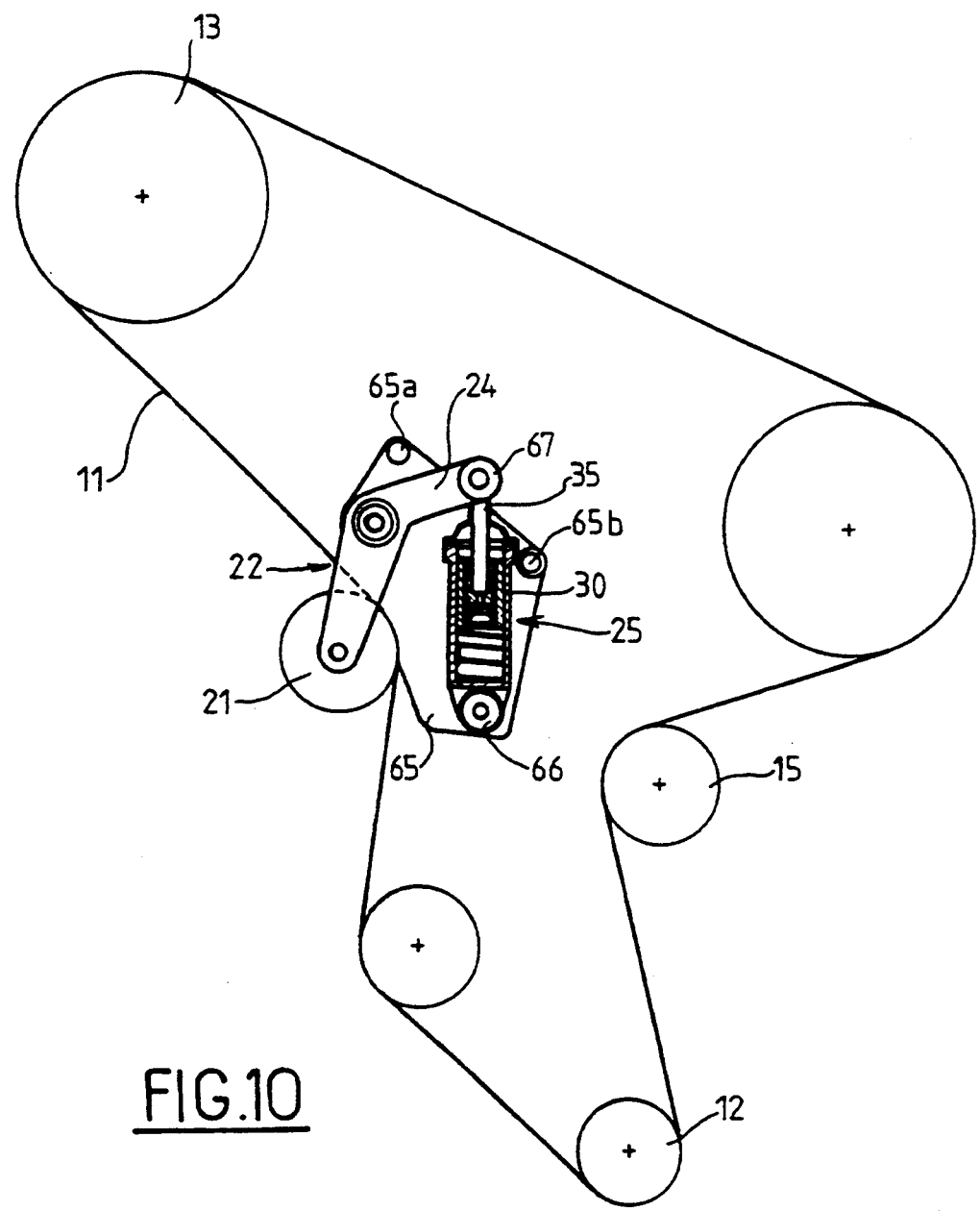
FIG. 10 is a view analogous to FIG. 1 showing how an assembly including a tensioner of the invention is installed in the timing system of a motor vehicle engine.

The scope of the invention also extends to assemblies including a tensioner such as that described above and associated with means for supporting it and installing it on an engine. As shown in FIG. 10, such an assembly comprises: an actuator 25 whose cylindrical body 30 is mounted on a plate 65 (having fasteners 65a and 65b engaging the engine) via a hinge 66 that is resilient in torsion (e.g. including a rubber ring), a similar hinge 67 being provided between the free end of the pusher 35 and the arm 24 of the crank 22 which carries the roller 21 cooperating with the belt 11.

What is claimed is:

1. A linear axial thrust tensioner for a belt, comprising a roller adapted to cooperate with the belt, an actuator for said roller including:

a cylindrical body;

a piston slidably mounted in said body thereby delimiting a pressure chamber and a supply chamber for a hydraulic fluid, a multiplicity of channels through said piston to optionally establish communication of said chambers with each other;

a push rod secured to said piston and whose motion is adapted to be transmitted to said roller;

a compression spring urging said piston towards the supply chamber; and a non-return valve located in the pressure chamber to open or close said channels, thereby allowing or preventing hydraulic fluid to pass between the pressure chamber and the supply chamber, said valve having an operative portion constituted by a flexible lip which deforms by bending and compression to come into contact with or to move away from its seat in order to close or open said channels.

2. A tensioner according to claim 1, wherein the operative portion of the valve, is made of a material selected for its resilient deformation characteristics, and chosen between the elastomer and the plastomer type materials.

3. A tensioner according to claim 1, wherein the operative portion of the valve, is made of a metal type material.

4. A tensioner according to claim 1, wherein the relationship between the force or stress applied as a function of the displacement of the piston is determined by selecting the stiffness of the valve which is itself determined by the cross-section shape of the flexible lip constituting its operative portion, and by the initial adjustment of the distance between the lip and the valve seat.

5. A tensioner according to claim 1, wherein the channels connecting the pressure chamber to the supply chamber are disposed parallel to the axis of symmetry of the valve, which valve comprises a body for its fixing by either screwing, crimping or force fitting to the piston and a tapering flexible lip.

* * * * *